Patented July 19, 1949

2,476,925

UNITED STATES PATENT OFFICE 2,476,925

PREPARATION OF THERAPEUTIC SUBSTANCES

Herbert Aubrey Stevenson and Wallace Frank Short, Nottingham, England, assignors to Boots Pure Drug Company Limited, Nottingham, England, a corporation of Great Britain No Drawing. Application October 3, 1945, Serial No. 620,174. In Great Britain October 17, 1944

4 Claims. (Cl. 260—239.6)

This invention relates to the preparation of substances having therapeutic properties.

In the co-pending patent application Serial No. 562,920, filed November 10, 1944, a method is set forth for the preparation of stable compounds of amino-acridines with sulphathiazole which have certain advantages in comparison with 2:8-diaminoacridine sulphate (proflavine) itself, especially in cases in which solutions approaching neutrality are essential. The process therein described consists in effecting a direct reaction between molecular proportions of sulphathiazole and the amino-acridine or between equivalent amounts of salts which, on admixture, give rise to those reactants.

It has now been discovered that stable compounds, having definite antistreptococcal properties, of amino-acridines with sulphanilylaminopyrimidines, such as for example, sulphadimethylpyrimidine, (2-4¹-aminobenzenesulphonylamino-4:6 dimethylpyrimidine) may be produced by similar processes.

Thus, according to the present invention, such compounds are formed by effecting reactions between molecular proportions of an amino-acridine and a sulphanilylaminodimethylpyrimidine or between equivalent amounts of salts which give rise to those reactants on admixture.

In order that the invention may be fully understood and readily carried into effect, some examples of processes in accordance therewith will now be described.

Example 1

In the preparation of a compound of sulphadimethylpyrimidine and 5-aminoacridine, sulphadimethylpyrimidine (5.56 gms.:0.02 mol.) is dissolved in boiling alcohol (200 ml.). 5-aminoacridine (3.88 gms.:0.02 mol.) is also added. The whole gives a clear solution which is filtered and cooled. Pale yellow crystals separate which melt at 229° C. with decomposition.

Example 2

In the preparation of a compound of sulphadimethylpyrimidine and 2:8 diaminoacridine, a solution of sulphadimethylpyrimidine (2.78 gms.:0.01 mol.) and 2:8-diaminoacridine (2.09 gms.:0.01 mol.) in boiling water (250 ml.) is filtered and cooled. The product is filtered off, washed with water and dried at 100° C.

The product separates in orange coloured prisms, which melt at 136°–137° C., and retains a molecule of water after drying at 100° C.

We claim:

1. Process for the manufacture of a new compound which consists in reacting 2-sulphanilamido-4.6-dimethyl pyrimidine with a member of the group consisting of 5-amino-acridine and 2.8-diaminoacridine.

2. Process as claimed in claim 1 in which the reactants are produced in situ by admixture and addition of their salts.

3. A new compound consisting of 2-sulphanilamido-4.6-dimethyl pyrimidine combined with 5-aminoacridine in equal molecular proportions, said compound being yellow and crystalline and melting with decomposition at 229° C., having antiseptic properties and being stable in aqueous solution, but decomposable into its constituents by treatment with acid or alkali.

4. A new compound consisting of 2-sulphanilamido-4.6-dimethyl pyrimidine combined with 2:8-diaminoacridine in equal molecular proportions, said compound being an orange crystalline solid retaining one molecule of water and melting at 136 to 137° C., having antiseptic properties and being stable in aqueous solution, but decomposable into its constituents by treatment with acid or alkali.

HERBERT AUBREY STEVENSON.
WALLACE FRANK SHORT.

REFERENCES CITED

The following references are of record in the file of this patent:

UNITED STATES PATENTS

| Number | Name | Date |
|---|---|---|
| 2,145,799 | Powell | Jan. 31, 1939 |
| 2,145,800 | Stuart | Jan. 31, 1939 |
| 2,351,333 | Gysin | June 13, 1944 |
| 2,370,561 | Mecca | Feb. 27, 1945 |

FOREIGN PATENTS

| Number | Country | Date |
|---|---|---|
| 114,894 | Australia | Mar. 17, 1942 |

OTHER REFERENCES

Journ. Indian Chem. Soc., vol. 16, pp. 364–368 (1939); ibid., vol. 18, pp. 25–28 (1941).

Ganapathi: Proc. Indian Acad. Sci., vol. 12–A, pp. 274–283 (Sept. 1940).

Northey: Chem. Rev., vol. 27, page 119 (Aug. 1940).